(12) United States Patent
Snodgrass et al.

(10) Patent No.: US 11,923,892 B2
(45) Date of Patent: Mar. 5, 2024

(54) METHOD AND ARCHITECTURE FOR POSITIVE IDENTIFICATION AND VERIFICATION OF MULTI-MODE FREQUENCY HOPPING SIGNALS

(71) Applicant: Raytheon Company, Waltham, MA (US)

(72) Inventors: Brian W. Snodgrass, Fort Wayne, IN (US); David Murray, Fort Wayne, IN (US); Jeffrey R. Gilson, Fort Wayne, IN (US); Nikolaus Kleber, Fort Wayne, IN (US); Joy Nyenhuis-Rouch, Fort Wayne, IN (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/748,690

(22) Filed: May 19, 2022

(65) Prior Publication Data
US 2023/0378999 A1    Nov. 23, 2023

(51) Int. Cl.
*H04B 1/7156* (2011.01)
*H04B 1/69* (2011.01)
*H04B 1/7143* (2011.01)

(52) U.S. Cl.
CPC ......... *H04B 1/7156* (2013.01); *H04B 1/7143* (2013.01); *H04B 2001/6908* (2013.01)

(58) Field of Classification Search
CPC ................ H04B 1/7156; H04B 1/7143; H04B 2001/6908
See application file for complete search history.

(56) References Cited

U.S. PATENT DOCUMENTS

| | | | | |
|---|---|---|---|---|
| 2010/0184384 A1* | 7/2010 | Jones | .................. | H04B 17/318 455/67.11 |
| 2014/0362420 A1* | 12/2014 | Borges | .................... | H04W 4/70 358/474 |
| 2019/0107599 A1* | 4/2019 | Pheiffer | .................. | G01S 7/021 |

* cited by examiner

*Primary Examiner* — Sam K Ahn
*Assistant Examiner* — Amneet Singh
(74) *Attorney, Agent, or Firm* — Burns & Levinson, LLP; Joseph M. Maraia

(57) ABSTRACT

Systems and methods are provided for updating data in a computer network. An exemplary method includes: scanning to capture a first set of signals; identifying from the first set of received signals a second set of signals having on times longer than a specified minimum dwell time; providing a plurality of signal profiles associated with a plurality of pulsed patterns of a signal of interest; identifying from the second set of signals a third set of signals that match at least one of the signal profiles; receiving demodulated data regarding the third set of signals; obtaining characteristic information for each of the third set of signals; verifying for each of the third set of signals their relevant information; determining whether the verification of the third set of signals produced a match; and upon determining of the match, providing an indication of a signal of interest.

20 Claims, 13 Drawing Sheets

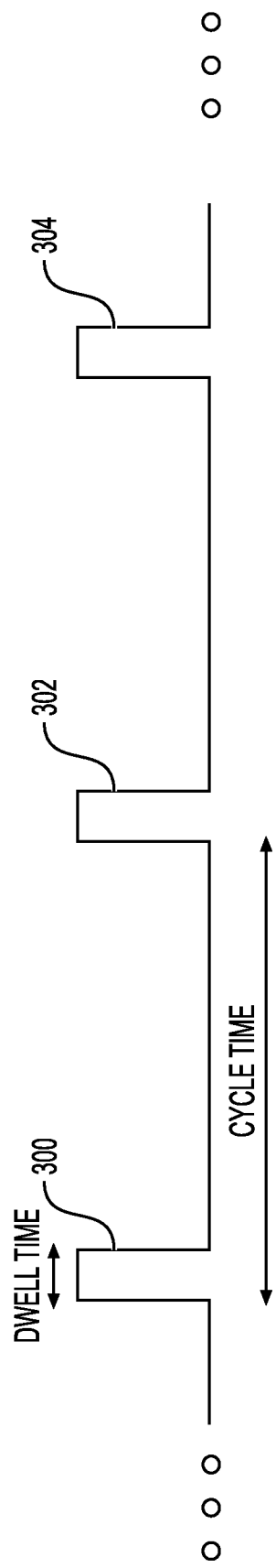

METHOD AND ARCHITECTURE FOR POSITIVE IDENTIFICATION AND VERIFICATION OF MULTI-MODE FREQUENCY HOPPING SIGNALS

GOVERNMENT LICENSE RIGHTS

This invention was made with government support under contract number N68936-18-D-0029. The government has certain rights in the invention.

BACKGROUND

Frequency-hopping spread spectrum (FHSS) is a commonly known approach for transmitting radio signals by rapidly changing the carrier frequency among many distinct frequencies occupying a sizeable spectral band. These changes are controlled by a code known to both a transmitter and a receiver. Some of the benefits of FHSS include avoiding interference, and preventing eavesdropping or jamming, and enabling code-division multiple access (CDMA) communications. In some instances, third party detection of an FHSS signal of interest (SOI) may be difficult.

Detection of an FHSS signal may be difficult when the SOI has over 100 modes including the following parameters: hop dwell, hop period, frequency range, bandwidth, symbol rate, modulation order, and the use of time-division duplexing (TDD). Moreover, the detection of the SOI is more difficult when the SOI mode is initially unknown or when interference from existing emitters (including other FHSS systems) exists.

There is a need to provide an architecture for positively identifying and verifying multi-mode frequency hopping signals.

SUMMARY

According to one aspect of the subject matter described in this disclosure, a method for identifying and verifying multi-mode frequency hopping signals is provided. The method comprises the following: scanning, for a select time period, to capture a first set of signals, wherein the first set of signals comprises a signal of interest (SOI); identifying from the first set of received signals a second set of signals having on times longer than a specified minimum dwell time; providing a plurality of signal profiles associated with a plurality of pulsed patterns having expected dwell times and cycle times of the signal of interest; identifying from the second set of signals a third set of signals that match at least one of the plurality of signal profiles; determining whether the third set of signals meet a first criterion; receiving demodulated data regarding the third set of signals; upon determining the first criterion is met, obtaining characteristic information for each of the third set of signals; verifying, using the characteristic information and demodulation data, for each of the third set of signals their cycle time, dwell time, and/or header information; determining whether the verification of the third set of signals produced a match; and upon determining of the match, providing an indication of the signal of interest.

According to another aspect of the subject matter described in this disclosure, a system for identifying and verifying multi-mode frequency hopping signals is provided. The system comprises one or more computing device processors. One or more computing device memories are coupled to the one or more computing device processors. The one or more computing device memories store instructions executed by the one or more computing device processors. The instructions are configured to: scan, for a select time period, to capture a first set of signals, wherein the first set of signals comprises a signal of interest (SOI); identify from the first set of signals a second set of signals having on times longer than a specified minimum dwell time; provide a plurality of signal profiles associated with a plurality of pulsed patterns having expected dwell times and cycle times of the signal of interest; identify from the second set of signals a third set of signals that match at least one of the plurality of signal profiles; determine whether the third set of signals meet a first criterion; upon determining the first criterion is met, receive demodulated data regarding the third set of signals; obtain characteristic information for each of the third set of signals; verify, using the characteristic information and demodulation data, for each of the third set of signals their cycle time, dwell time, and/or header information; determine whether the verification of the third set of signals produced a match; and upon determining of the match, provide an indication of the signal of interest.

According to another aspect of the subject matter described in this disclosure, a non-transitory computer-readable storage medium storing instructions which when executed by a computer cause the computer to perform a method for identifying and verifying multi-mode frequency hopping signals is provided. The method comprises the following: scanning, for a select time period, to capture a first set of signals, wherein the first set of signals comprises a signal of interest (SOI); identifying from the first set of received signals a second set of signals having on times longer than a specified minimum dwell time; providing a plurality of signal profiles associated with a plurality of pulsed patterns having expect dwell times and cycle times of the signal of interest; identifying from the second set of signals a third set of signals that match at least one of the plurality of signal profiles; determining whether the third set of signals meet a first criterion; receiving demodulated data regarding the third set of signals; upon determining the first criterion is met, obtaining characteristic information for each of the third set of signals; verifying, using the characteristic information and demodulation data, for each of the third set of signals their cycle time, dwell time, and/or header information; determining whether the verification of the third set of signals produced a match; and upon determining of the match, providing an indication of the signal of interest.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIG. 3 is a schematic diagram of a single channel SOI signal timing measurement used in a coarse detection process, in accordance with some embodiments.

DETAILED DESCRIPTION

Figure 1:
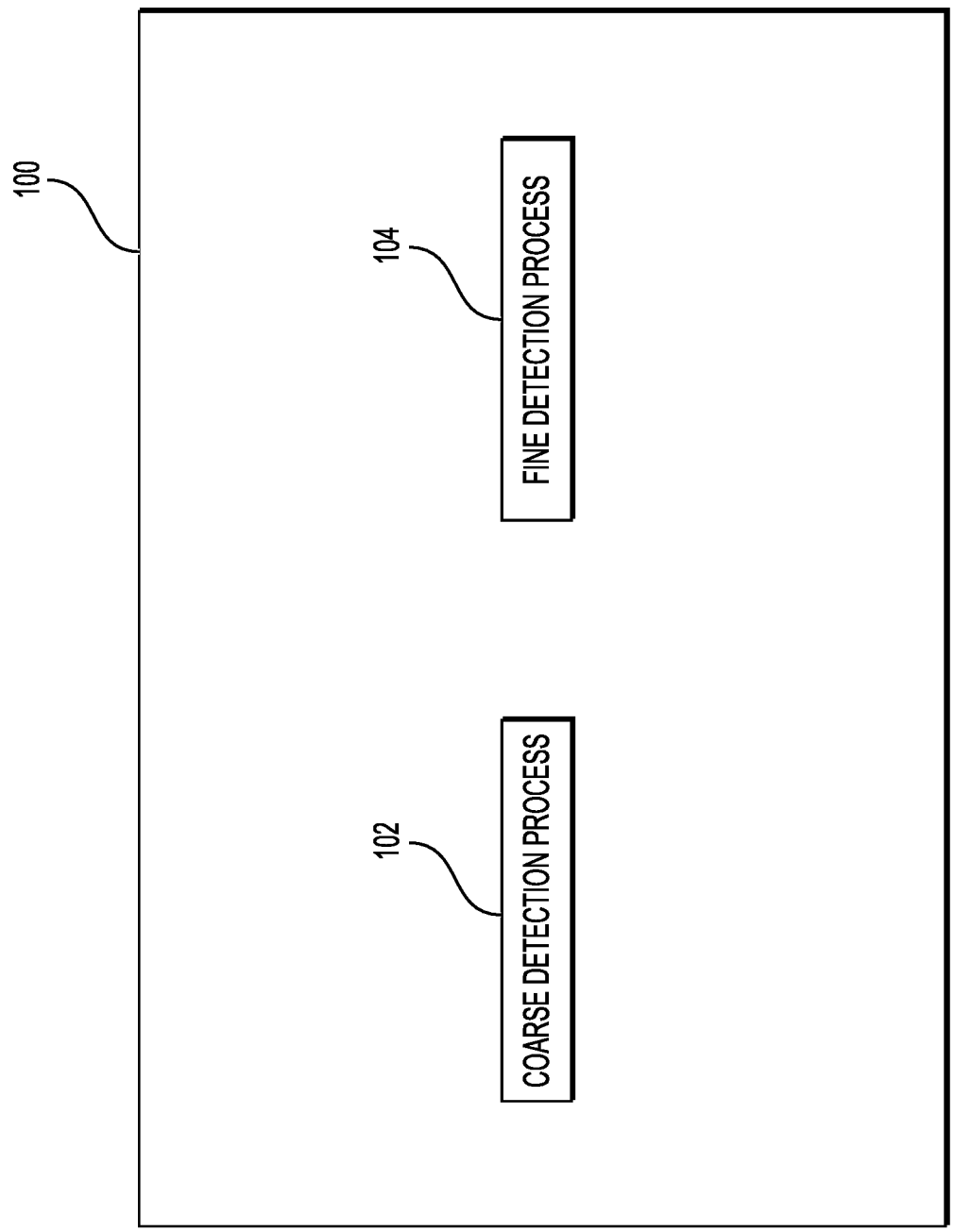
FIG. 1 is a schematic diagram of an architecture for positively identifying and verifying multi-mode frequency hopping signals, in accordance with some embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes an architecture for positively identifying and verifying multi-mode frequency hopping signals. The architecture utilizes two detection processes. The first is a coarse detection process used to quickly identify a set of new signals for later analysis based on a first criteria. After the set of new signals have been identified, a fine detection process further analyzes the new signals by attempting demodulation of the signal header of each new signal and examining the header bits to verify if a new signal truly is the SOI and additionally confirm which mode it is operating in.

FIG. 1 is a schematic diagram of the architecture 100 for positively identifying and verifying multi-mode frequency hopping signals, in accordance with some embodiments. The architecture 100 includes a coarse detection process 102 and fine detection 104. The coarse detection process 102 may evaluate a new received signal to check for a pulsed pattern that matches the expected SOT pulse dwell and pulse cycle times. The coarse detection process 102 is used to quickly identify a set of new signals for later analysis. A fine detection process 104 further analyzes the set of new signals by demodulating the signal header of each new signal and examining the header bits to verify if a new signal truly is the SOI and additionally confirm which mode it is operating in.

The architecture 100 utilizes repeated Fast Fourier transform (FFT) scans to assess a given band. The FFT scans occur in a bandwidth wide enough to capture all of the SOI channels at once. A higher bandwidth also completes the Fast Fourier transform (FFT) scans more quickly, which is desirable for giving better timing resolution (shorter time to complete a single scan) when a given frequency is up or down.

A sufficient number of contiguous FFT scans must occur to capture and characterize all the desired transient signals. The scan time should be at minimum, slightly longer than the time to complete 2 full cycles in the slowest possible mode of the SOL. This guarantees the possibility of capturing 2 full SOI pulses on each frequency and the ability to get a rough measurement of the pulse dwell time (and reference "on-time") and the cycle time between pulses.

In some implementations, the coarse detection process 102 uses a "channelized" search feature, which causes measured frequencies to be reported at the nearest defined channel center. The result of the FFT scans may include the times that each channel was reported active or inactive, to a rough resolution based on the FFT scan time.

The coarse detection process 102 uses the signal rising and falling times from the FFT scans to classify each Detected Frequency (DF) channel as a candidate, priority candidate, or non-candidate for each possible SOI mode. The SOI mode candidate status is used to determine if further analysis should be performed by the fine detection process 104, and on which DFs.

In particular, the coarse detection process 102 is an FFT-based detection of frequencies and allows coarse timing measurements of signal on/off status across a wide band of frequencies. The fine detection process 104 involves tuning to a single frequency and analyzing received data samples at a single frequency. It allows for precise timing measurements and possibly data demodulation.

Figure 2:
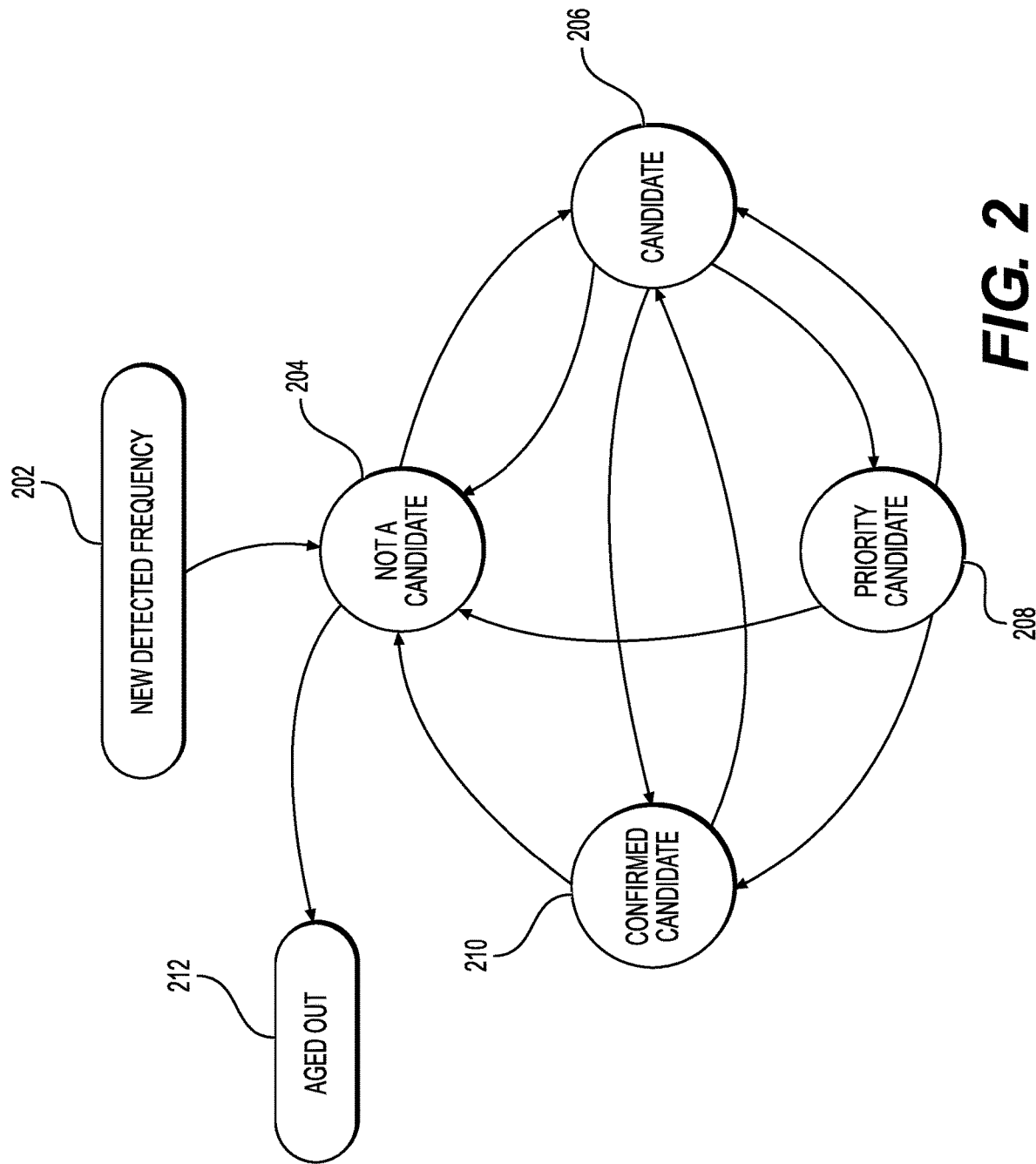
FIG. 2 is a state diagram of the possible states of each detected frequency as determined during the course of the coarse detection process and fine detection process, in accordance with some embodiments.

FIG. 2 is an example state diagram of the possible states of each DF when performing the operations of the coarse detection process 102 and fine detection process 104, in accordance with some embodiments. The example state diagram shows a "New Detected Frequency" state 202 for a new DF transitioning to a "Not a Candidate" state 204 for each mode when first seen in the coarse detection process. Moreover, a state may transition to the "Not a Candidate" state 204 if during the coarse detection process 102 or fine detection process 104, the signal is "off" for more than the SOI mode's maximum possible "off" time, then the channel should be ruled out as a candidate for that mode. In addition, a state may transition from the "Not a Candidate" state 204 to an "Aged timeout" state 212 if the "off" time exceeds a predefined timeout period, removing the DF from further consideration.

Once the received signal on a given frequency channel has remained "on" (magnitude above a threshold) for at least the SOI mode's minimum dwell time, the status transitions to a "Candidate" state 206. Note that most received signals are likely to be considered "Candidates", with this criterion, including any signal that is simply always on. The main purpose of this state is to avoid ruling out a channel that may contain the SOI as well as other interference, rather than to indicate any particular likelihood of the SOI being present.

Because DFs in the "Candidate" state 206 for a given mode are not considered especially likely to actually contain the SOL, these DFs are not scheduled to perform initial SOI analysis, but they can be analyzed after the initial analysis has shown that the SOI is indeed present, and no other "Priority Candidates" remain to be analyzed.

A channel is in a "Priority Candidate" state 208 for a particular SOI mode when the coarse detection process 102 has found a pulsed pattern on that matches the expected SOI pulse dwell and pulse cycle times. The coarse detection process 102 looks for pulsed activity and keeps track of the measured pulse duration and pulse start time on each channel to see if they match the expected values defined by a select number of profiles to be discussed hereinafter.

The coarse detection process 102 needs to keep track of timing information for at least three pulses 300, 302, and 304 per channel (the current or most recent pulse, and the two previous pulses), as shown in FIG. 3. The coarse detection process' timing is coarse due to the time required to gather the FFT samples as well as process the results.

To consider a channel with detected pulses as a priority candidate, the width of two consecutive pulses needs to be consistent and match the expected pulse width within a tolerance. Also, the measured pulse cycle time needs to match the expected cycle time. For a single pulse per cycle, this would only require one to keep track of two pulses, but it is possible that the SOI may operate in a time division-duplexing (TDD) mode where two pulses per cycle are generated in a back-to-back fashion with a guard time between the pulses. When this happens, the length of time of the gap between pulses may be such that the coarse detection process 102 only sometimes resolve two consecutive pulses, and sometimes see one longer pulse.

FIGS. 4A-4D are schematic diagrams of possible appearances of TDD profiles used by the coarse detection process 102, in accordance with some embodiments. The coarse detection process 102 accounts for at least four profiles 402-408 when analyzing the pulse dwell and cycle times. Note that dwell times for each mode may include the possibility for a TDD mode being seen as a single long pulse within the range of allowable pulse dwell times. The minimum pulse dwell time for each mode should be set to the minimum single-pulse dwell time for that mode. The maximum pulse dwell time for each mode should be set to the longest possible TDD dwell time, which allows all possibilities above to be considered valid pulse times.

The following assumptions are used for the description of the criteria for a coarse detection "match" herein:
P0, P1, and P2 represent the most recent pulse, previous pulse, and 2nd previous pulse.
Terr is the timing error tolerance, equal to the amount of possible timing error for each rising/falling event recorded by the coarse detection process 102.
N is the expected number of active channels or number of hops in the hop cycle.

Figure 4A:
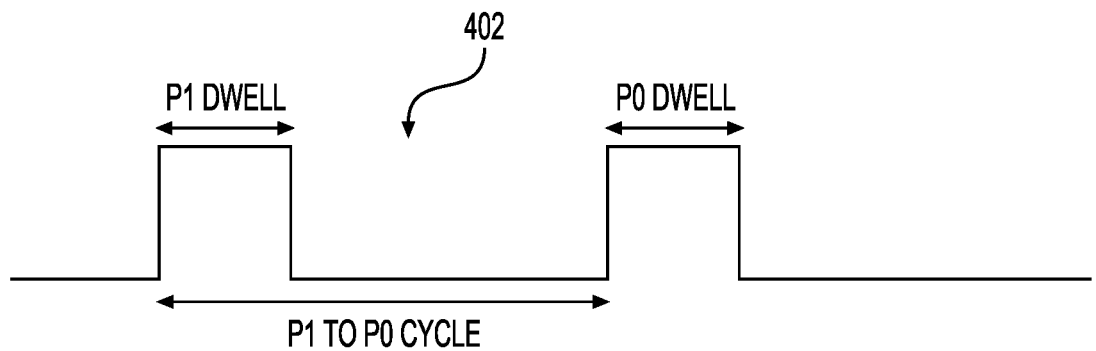
FIGS. 4A-4D are schematic diagrams of possible appearances of two cycles of TDD profiles used by the coarse detection process.

FIG. 4A is a schematic diagram of the coarse detection process profile 402 for a single pulse mode or non-TDD mode, in accordance with some embodiments. The coarse detection process profile 402 is defined by P0 dwell=P1 dwell (within +/− 4*Terr), and both P0 dwell and P1 dwell are within the SOI mode's pulse dwell range (+/−2*Terr). Moreover, the P1 to P0 cycle time is within the SOI mode's cycle time range (+/− 2*Terr), and the measured cycle time is at least N times the dwell time: P1 to P0 cycle time+ 2*Terr≥N*max(P0 dwell, P1 dwell).

Figure 4B:
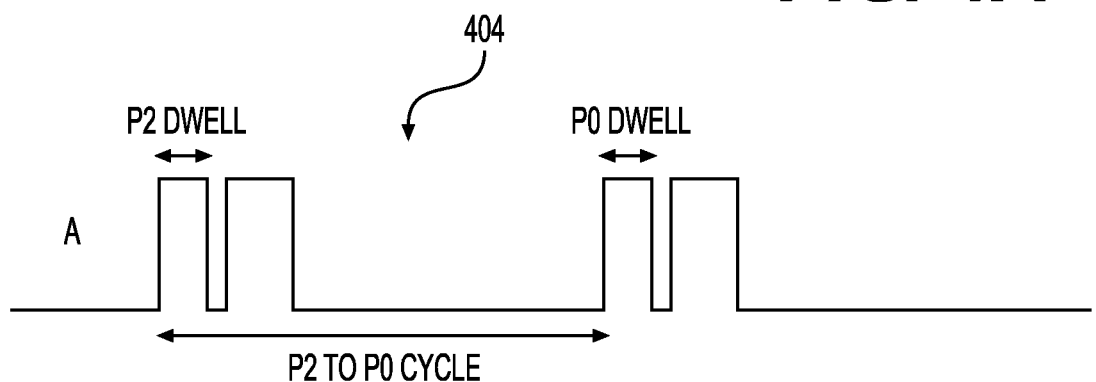

FIG. 4B is a schematic diagram of the coarse detection process profile 404 for a TDD mode, in accordance with some embodiments. The coarse detection process profile 404 is defined by P0 dwell=P2 dwell (within +/−4*Terr), and both P0 dwell and P2 dwell are within the SOI mode's pulse dwell range (+/−2*Terr). Moreover, the P2 to P0 cycle time is within the SOI mode's cycle time range (+/−2*Terr), and the measured cycle time is at least N times the dwell time: P2 to P0 cycle time+2*Terr≥N*max(P0 dwell, P2 dwell).

Figure 4C:
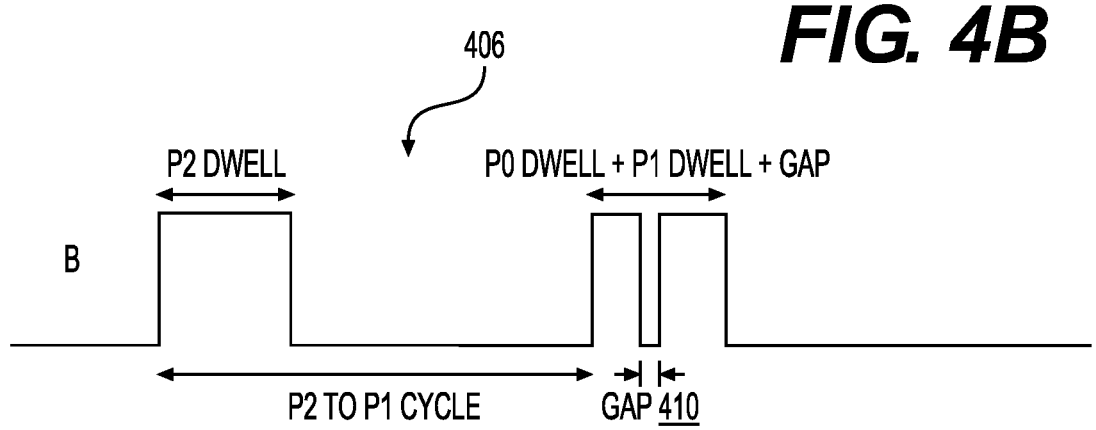

FIG. 4C is a schematic diagram of the coarse detection process profile 406 for a TDD mode, in accordance with some embodiments. If gap 410 between pulse P0 and pulse P1 is less than or equal to 2 times Terr, then the coarse detection process combines pulse P0, pulse P1, and gap 410 as if they are a single pulse and compares the combined pulse to pulse P2 using the same criteria as discussed in FIG. 4A above.

Figure 4D:
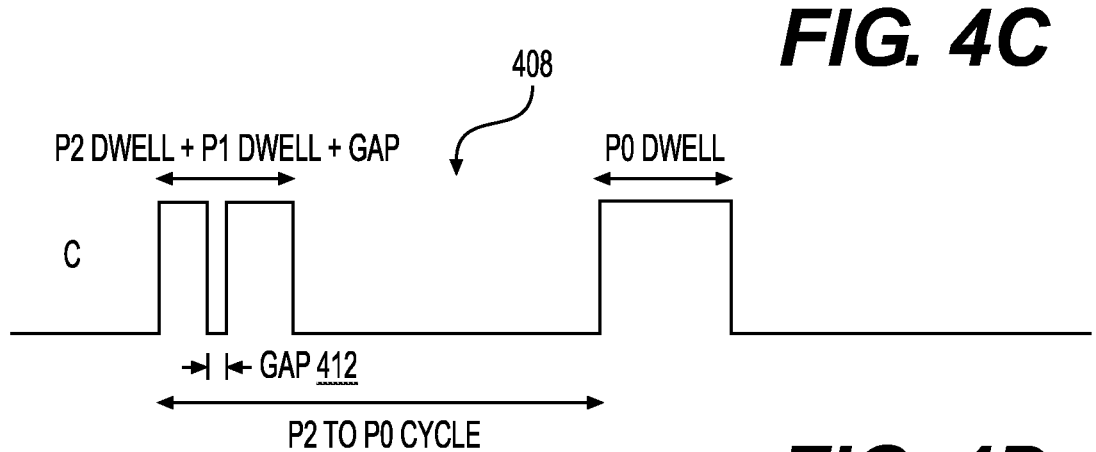

FIG. 4D is a schematic diagram of the coarse detection process profile 408 for a TDD mode, in accordance with some embodiments. If gap 312 between pulse P1 and pulse P2 is less than or equal to 2 times Terr, then the coarse detection process combines pulse P1, pulse P2, and gap 312 as if they are a single pulse and compares it to pulse P0 using the same criteria as discussed in FIG. 4A above.

If any received signal meets the above four profile 402-408, then the channel in question is considered a potential match and a "Priority" candidate for analysis. As shown in the state diagram of FIG. 2, once the "Priority Candidate" state 208 is reached, it remains in that state until it is analyzed or until the signal has been down for too long causing it to transition to "Not a Candidate" state 204. Therefore, it is not necessary for the coarse detection process 102 to continue measuring additional pulse timings for a DF that is a Priority Candidate, except for making sure it does not go off for too long to disqualify it from being a candidate.

A channel becomes a Confirmed Candidate for a particular mode when fine detection process 104 performs its analysis and determines the channel is a match under its criteria. In this case, the "Priority Candidate" state 208 transitions to a "Confirmed Candidate" state 210, to be discussed further herein.

Note that if a channel becomes a Confirmed Candidate for a given mode, then that channel can no longer be considered a Priority Candidate for another mode. Since multiple SOI modes may have similar pulse profiles, it is likely that a channel with a Confirmed Candidate could continue showing up as a Priority Candidate for other modes. This prevents extra analysis being performed in search of SOI modes. In some implementations, the state diagram of FIG. 2 may exist for each SOI mode category for each DF. Each DF may essentially have an array of current states against the different possible categories of a SOI mode. The possible SOI modes (could be thousands of possible parameter combinations) are grouped into only a small number of categories with similar timing profiles and the same modulation rate.

As the channels are each characterized as an eligible candidate (or not) for each mode, counts for each mode are maintained of all channels that meet the "Candidate", "Priority Candidate", or "Confirmed Candidate" states. At least one Priority Candidate and at least N total candidates (including priority and confirmed candidates) are required to initiate fine detection process 104, where N is the expected total number of active channels.

Final verification of the SOI is done by the fine detection process 104. The fine detection process 104 includes demodulating the signal header and examining the header bits to verify if the signal truly is the SOI and additionally confirm which mode it is operating in. If a minimum number of channels are matches, then the fine detection process 104 declares a match and reports the SOI as detected.

Figure 5:
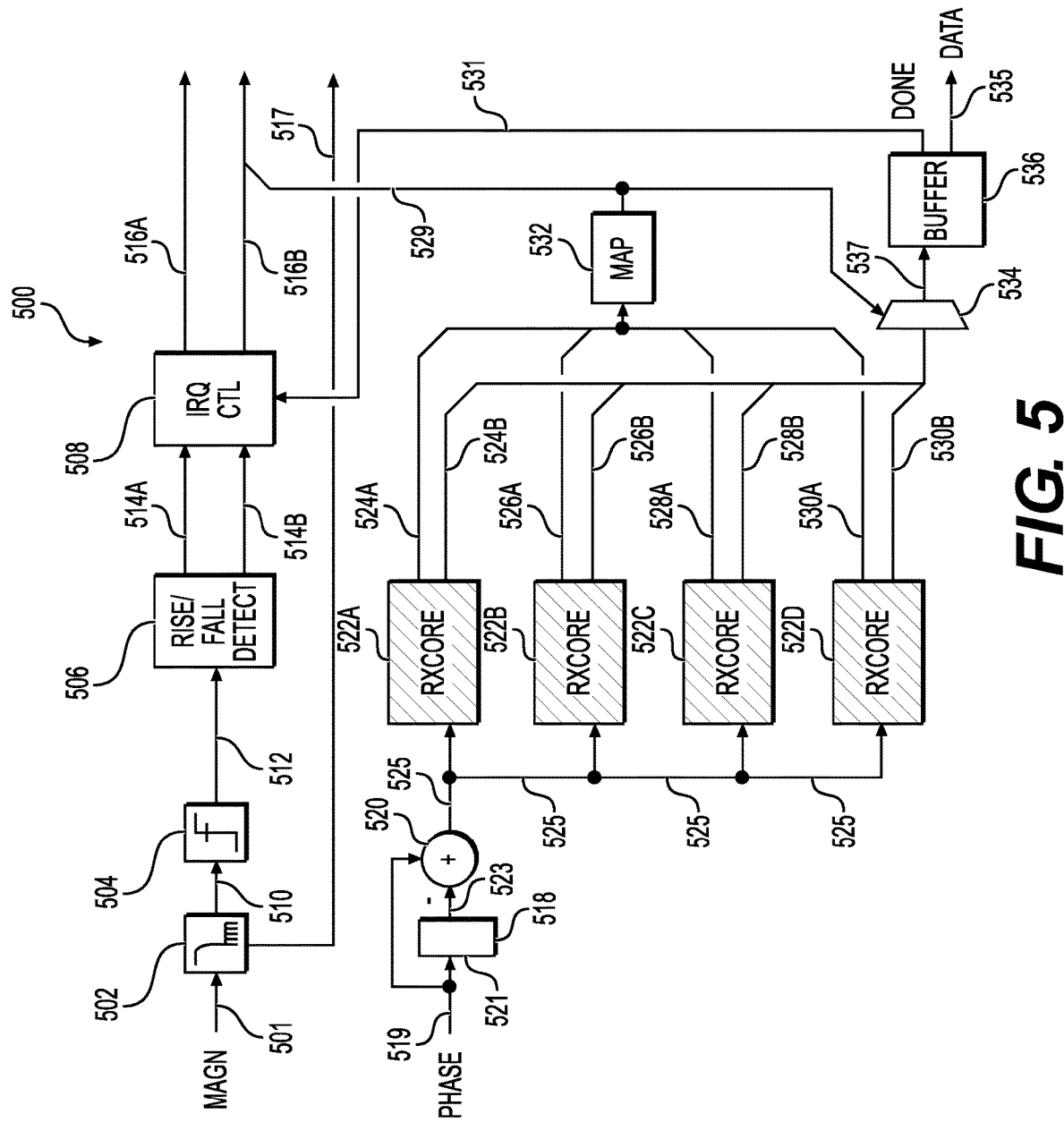
FIG. 5 is a schematic diagram of a Field Programmable Gate Array (FPGA) for analyzing phase and magnitude data of a received signal for demodulation, in accordance with some embodiments.

FIG. 5 is a schematic diagram of a Field Programmable Gate Array (FPGA) 500 for analyzing phase and magnitude data of a received signal for demodulation, in accordance with some embodiments. The magnitude (magn) of the received signal is analyzed using a burst management approach. In particular, the FPGA 500 includes an exponential integrator 502 that receives the magnitude (magn) 501 of the received signal. The exponential integrator 502 smooths the magnitude (magn) 501 of the received signal for further processing. A threshold decision circuit 504 receives the smoothed output signal 510 of exponential integrator 502 and determines whether the received smoothed output signal 510 passes above the rising threshold or falls below the falling threshold.

A rise/fall detector 506 receives the output signal 512 of threshold decision circuit 504. The rise/fall detector 506 sends an indication when output signal 512 is at a rising edge via output signal 514A or at a falling edge via output signal 514B. An interrupt controller 508 receives output signals 514A and 514B of rise/fall detector 506 and issues an interrupt via output signal 516A when it receives an indication from either output signal 514A or 514B that a rising/falling edge has been detected, or when it receives an indication that receive data buffering is completed via signal 531. Moreover, the interrupt controller 508 issues an indication of which interrupt occurred via output signal 516B.

To analyze the phase differential of the received signal, the FPGA 500 includes a D flip-flop 518 receiving a signal 519 indicative of the phase of the received signal, and receives a clock signal 521. A summing circuit 520 receives as input the signal 519 and the output signal 523 of D flip-flop 518. The summing circuit 520 outputs as output signal 525 the difference between output signals 519 and 523 indicative of the phase difference. The output signal 525 is indicative of the phase differential of the received signal one clock cycle before the current phase of the received signal.

The FPGA 500 includes a number of receiver core (RXCORE) blocks 522A-522D to perform analysis on multiple possible symbol rates simultaneously for multiple SOI modes. Each RXCORE block 522A-522D operates on the differentiated phase (i.e. the frequency) of the received signal. In this implementation, each RXCORE block 522A-522D receives as input output signal 525. The RXCORE blocks 522A-522D operate in parallel to achieve the simultaneous processing. While FPGA 500 includes 4 RXCORE blocks 522A-522D, the number of RXCORE blocks may vary in other embodiments.

Parallel processing allows FPGA 500 to perform demodulation of multiple different data rates and different sync patterns at once, shortening the time to achieve correct demodulation when the data rate of the SOI is unknown although known to be one of a finite number of possibilities. Also, each RXCORE block 522A-522D outputs a signal (524A, 526A, 528A, 530A) indicating whether a sync has occurred, and a second signal (524B, 526B, 528B, 530B) indicative of the clock and demodulated data.

The output signals 524A, 526A, 528A, and 530A are directed to a map block 532. The map block 532 encodes the relevant output signals 524A, 526A, 528A, and 530A to be a select input signal 529 of a multiplexer 534. Moreover, the signal 529 together with signal 516B are used to indicate which interrupt occurred. Note 516B may indicate whether the interrupt was a rising edge, falling edge, or a sync/bits ready interrupt, and signal 529 may indicate, in the case of a sync/bits ready interrupt, which RXCORE generated the data. The output signals 524B, 526B, 528B, and 530B are input to multiplexer 534. Depending on select input signal 529, one of the output signals 524B, 526B, 528B, and 530B is selected to be output signal 537 of multiplexer 534. A buffer 536 receives output signal 537. In addition, the buffer 536 provides as output an output signal 535 that is indicative of the demodulated received signal data, and output signal 531 to interrupt controller 508. The output signal 531 indicates that the buffer has completed collection of the demodulated data, and therefore the interrupt controller 508 should generate a corresponding interrupt.

The fine detection process 104 may use the FPGA clock time provided at the interrupt controller 508 to assess the transmit burst on time and cycle time. The timing of these events is used along with the presence and timing of a sync correlator bits ready interrupt, associated with output signal 531, to determine whether the SOI is present, to be discussed further herein. In some implementations, a separate free-running counter providing FPGA clock time may be provided. Whenever an interrupt is generated by interrupt controller 508, the FPGA clock time may be stored in a register providing precise timing of when the interrupts occur. Note the magnitude threshold crossing times allow for accurate measurements of dwell time and cycle time.

Figure 6:
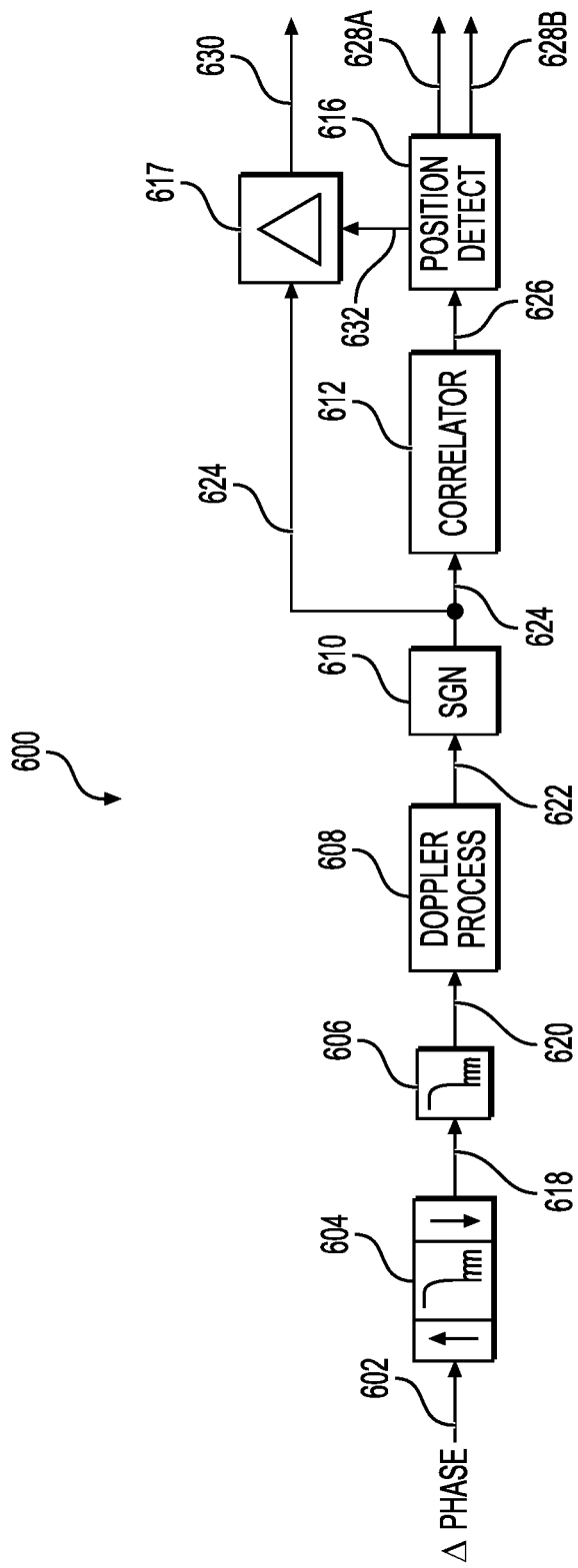
FIG. 6 is a schematic diagram of a RXCORE block of FIG. 5, in accordance with some embodiments.

FIG. 6 is a schematic diagram of an RXCORE block 600, in accordance with some embodiments. The RXCORE block 600 is similar to each RXCORE block 522A-522D of FIG. 5. The RXCORE 600 implements a rate conversion that interpolates by zero insertion, executes an anti-aliasing FIR filter and decimates if necessary using filter 604 and smooths the result using a low-pass filter (LPF) 606. The RXCORE 600 receives a differentiated phase signal 602. This is useful for converting the rate from the analysis sample rate to an integer multiple of the tested symbol rate. Multiple rate conversions occurring within the parallel RXCORE blocks allow more than one symbol rate to be tested simultaneously. In this case, filter 604 receives differentiated signal 602 and performs rate conversion on differentiated signal 602. The LPF 606 receives output signal 618 and performs additional smoothing on output signal 618.

A Doppler process block 608 receives output signal 620 from LPF 606. The Doppler process block 608 accounts for a frequency offset between the tuned frequency of the receiver and the perceived frequency of the emitter. This may be due to Doppler Effect (relative motion between the receiver and the emitter of interest) or actual transmitter frequency offset (i.e., reference oscillator inaccuracy). The Doppler process block 608 is particularly important in slow data rate modes with small frequency deviation, as a relatively small shift in frequency could result in symbol errors. A limit is put on the maximum amount of Doppler correction that can be applied to avoid shifting all the way over to an adjacent channel.

A sign circuit 610 receives output signal 622 from Doppler process block 608. The sign circuit 610 outputs signal 624 as the one-bit sign of the signal 622. A delay block 617 receives output signal 624 from sign circuit 610 and a position signal 632 from the position detect block 616. The output signal 630 of delay block 617 is indicative of output signal 624 being delayed to align with the delays associated with the correlator block 612 and the position detect block 616. Note output signal 630 is a component of output signals 524B, 526B, 528B, and 530B of FIG. 5.

A correlator block 612 receives output signal 624 and a position detection block 616 receives output signal 626 from correlator block 612. The correlator block 612 and position detection block 616 are used to detect and align to a programmable synchronization pattern. Some symbols may optionally be masked off from the synchronization pattern. When the correlation threshold is crossed, the demodulated and aligned header bits of the received signals along with an associated clock are output from the RXCORE 600 as signals 630 (data) and 628A (clock).

Note that clock and data signals 628A and 630 are represented in a combined fashion in FIG. 5, where signals 524B, 526B, 528B, and 530B all represent combined instances of signals 628A and 630. Moreover, the position detection block 616 generates a sync signal 628B, which are identical to the instances of signals 524A, 526A, 528A, and 530A on FIG. 5. The FPGA 500 stores the data from the RXCORE that generated the sync by routing the clock/data signals from the appropriate RXCORE through the multiplexer 534 and into the buffer 536.

Once the buffer 536 has stored the expected number of bits, the DONE signal 531 causes a bits ready interrupt to be generated by the interrupt controller 508, which indicates to the fine detection process 104 that the received data is ready to be read from the buffer 536 and which RXCORE block 522A-522D detected the sync and generated the data. Once the sync/bit Ready interrupt via signals 516A, 516B, 529 occurs, the fine detection process 104 copies the demodulated data bits from the FPGA's buffer 536.

Figure 7:
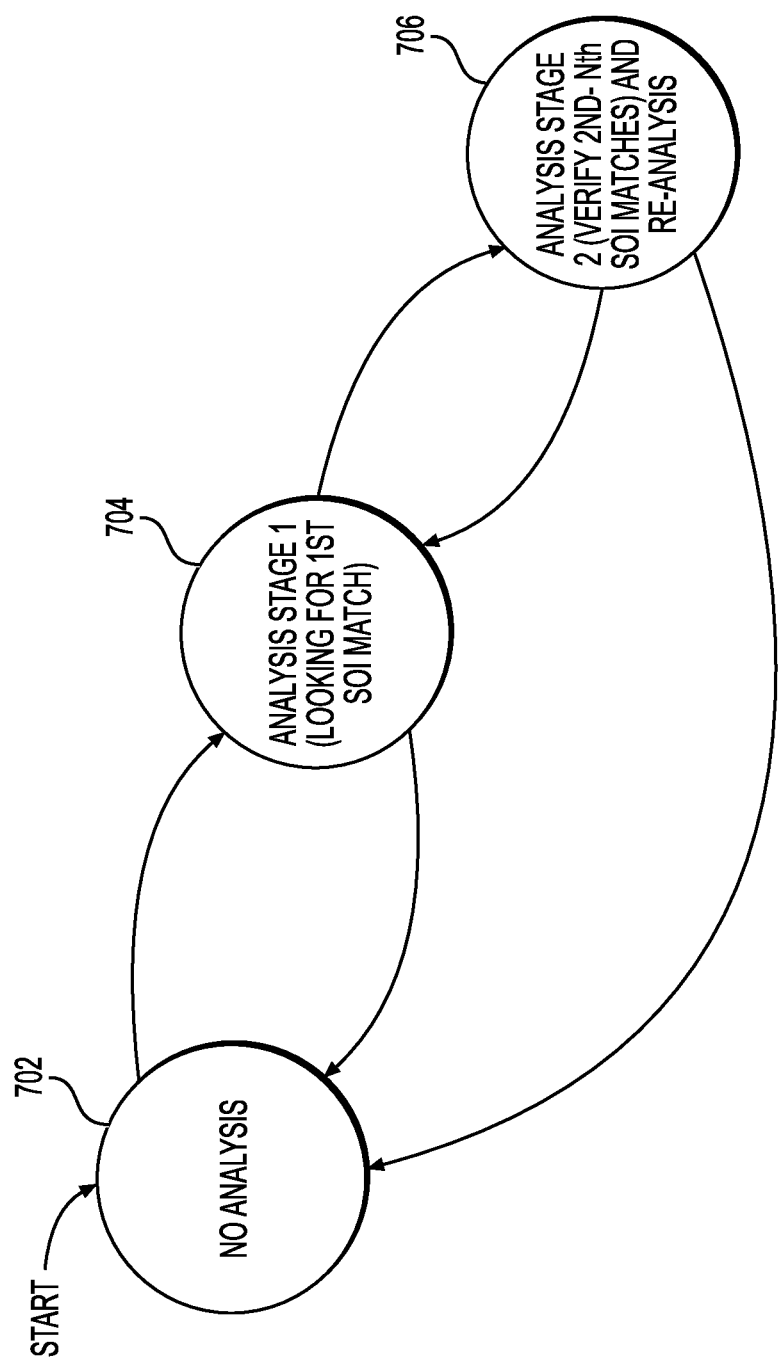
FIG. 7 is a state diagram of the possible states of a fine detection process, in accordance with some embodiments.

FIG. 7 is a state diagram of the possible states of a fine detection process 104, in accordance with some embodiments. The fine detection process 700 is set initially at the "No Analysis" state 702. The fine detection process 700 may transition from the "No Analysis" state 702 to the "Stage 1" state 704 when criteria for Stage 1 are met. The Stage 1's criteria require at least N total candidate channels from the coarse detection process for a given SOI mode, where N is the expected number of SOI active channels. In addition, the Stage 1's criteria require at least one candidate must be considered a Priority Candidate, as only Priority Candidates are analyzed in Stage 1. Note if the Stage 1 criteria are not met, the current state reverts to the "No Analysis" state 702. The coarse detection process 102 and fine detection process 104 may run in parallel to some degree. The demodulated data is generated as part of the fine detection process, 104.

Once Stage 1 is complete, the fine detection process 104 may transition to a "Stage 2" state 706, if Stage 2 criteria are met. The Stage 2 criteria require at least N total candidate channels (including priority and confirmed candidates) for a given SOI mode, where N is the expected number of SOI active channels, and at least one confirmed SOI candidate for the given mode, which was matched in Stage 1. Stage 2 analysis continues until all candidates are checked or until SOI is entirely found, or if Confirmed SOI Candidates are scheduled for re-analysis. If it is determined Stage 2's criteria are not met, then the current state returns to the "No analysis" state 702 if Stage 1 criteria are also not met. When Stage 2 has completed its analysis, the current state may transition to the "Stage 1" state 704 only if Stage 1 criteria are met.

If more than one SOI mode meets Stage 1's criteria, and the channel to be analyzed is a candidate for more than one mode, then the parallel processing in the FPGA 500 is used to analyze more than one mode at once, if possible. If more than one separate analysis is required to analyze all modes of the current channel, then the analysis should proceed in order of fastest analysis to complete. Modes with the shortest maximum cycle time are the fastest to complete and should be performed first.

Figure 8:
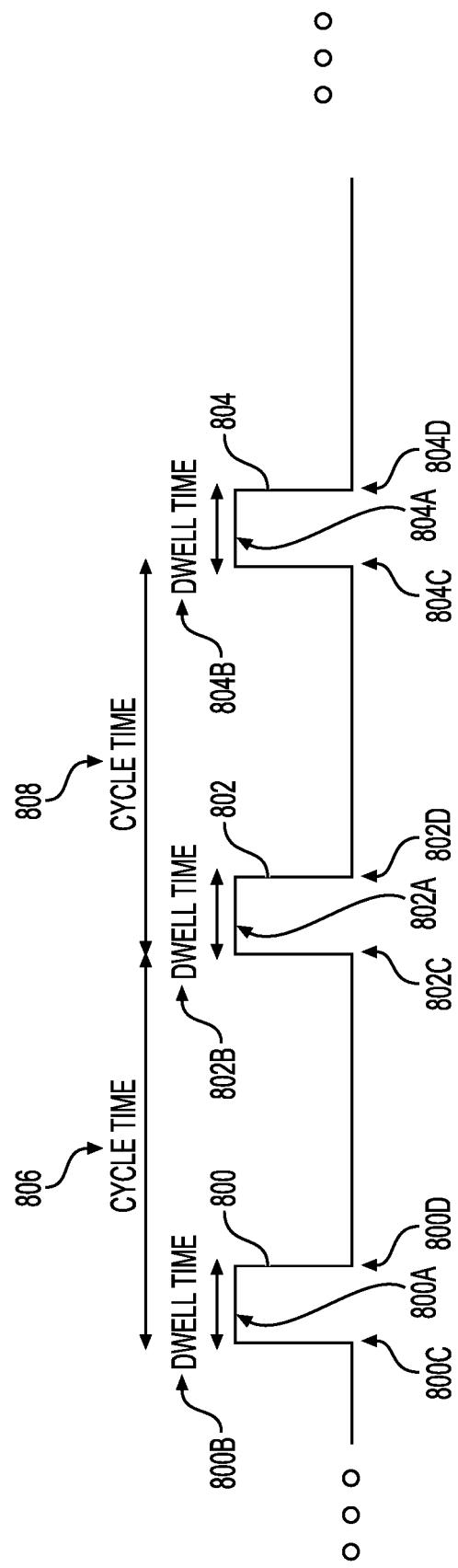
FIG. 8 is a schematic diagram of an analysis timeline for a single pulse mode.

In Stage 1, the fine detection process 104 looks for 3 consecutive cycles with a sync correlator firing to indicate the SOI was found, as shown in FIG. 8. Each of the three consecutive cycles includes a pulse 800, 802, and 804. Three cycles are needed to get two measurements of the cycle times 806 and 808 to verify it is consistent. FIG. 8 shows the general idea of the timeline for analysis of the SOI signal in single pulse mode. In particular, for each pulse 800, 802, and 804, its header data 800A, 802A, and 804A is verified, its dwell time 800B, 802B, and 804B is verified, and cycle times 806 and 808 are verified. Note the verification of header data 800A, 802A, and 804A, dwell time 800B, 802B, and 804B, and cycle times 806 and 808 is done in Stage 2 of fine detection process 104. Dwell times 800B, 802B, and 804B are determined using the rising edge 800C, 802C, and 804C and falling edge 800D, 802D, and 804D.

Figure 9:
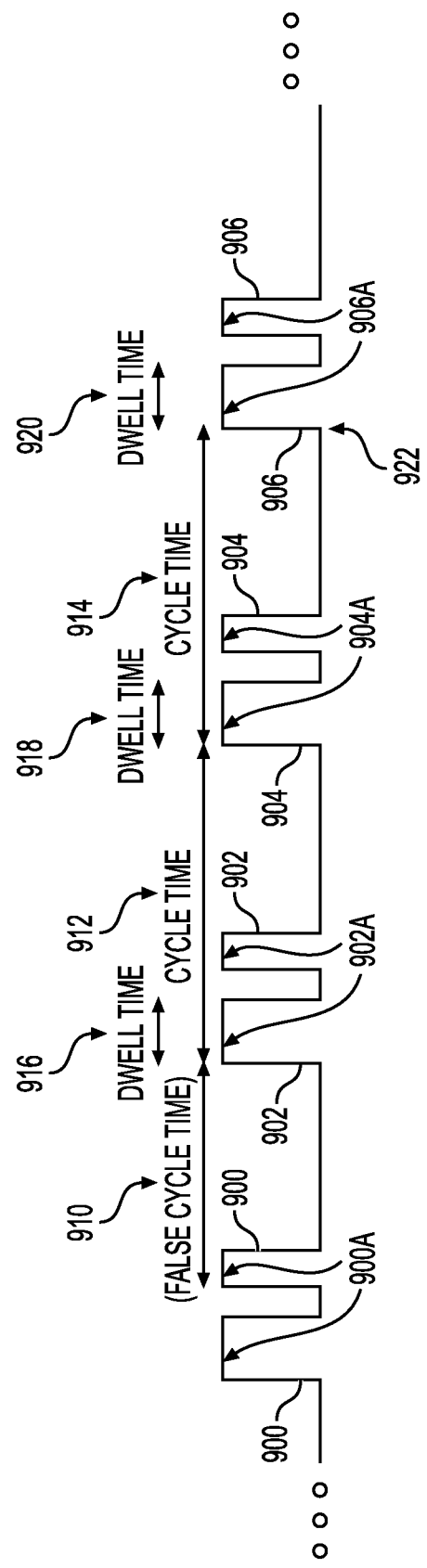
FIG. 9 is a schematic diagram of an analysis timeline in a time-division duplex (TDD) mode, in accordance with some embodiments.

FIG. 9 is a schematic diagram of an analysis timeline in a TDD mode, in accordance with some embodiments. In particular, FIG. 9 shows another possibility of a timeline when the SOI is operating in TDD mode. Each pair of pulses 900, 902, 904, and 906 in TDD mode have the same header bits 900A, 902A, 904A, and 906A, so a sync is expected for each pair of pulses 900, 902, 904, and 906. If two consecutive sync IRQs occur in rapid succession, the second one should be ignored for purposes of determining the cycle time. But, if analysis starts in between the two pulses, a false cycle time 910 could be detected. For this reason, if the first two cycle times 910 and 912 do not match, a third cycle time 914 is measured to see if it matches. Dwell times 916, 918, and 920 are computed in the same fashion as discussed in FIG. 8.

The initial timeout for analysis to complete may be equal to the maximum cycle time plus the maximum dwell time for the given mode being analyzed. Parallel analysis may be used if the channel is a Priority Candidate for more than one SOI mode, and if those modes are suitable for parallel analysis. If more than one mode is to be analyzed in parallel, then the timeout to be used is the maximum among the different Priority Candidate modes being analyzed. This ensures that the analysis is running long enough for one entire burst to be captured.

If a sync is detected (sync correlator IRQ fires as indicated by FPGA signals 516A and 516B), the timeout is extended for an additional maximum cycle time so that a potential second burst can be analyzed. The timeout is similarly extended so that a third burst can be analyzed, and, in the case of mismatching cycle times, one more timeout extension is granted so that a fourth burst can be analyzed. The second pulse in a back-to-back pair of syncs is ignored. Note a second sync is considered back-to-back if the sync interrupt occurred within [MaxCycleTime/N], where N is the expected number of active SOI channels. Cycle times are considered "matching" if they are within a programmable error tolerance.

A match is considered in Stage 1 if the 3 pulses with sync interrupts have matching cycle times that fall within the valid cycle time range. If a match is achieved, then the reference on time T0, associated with rising edge 804C or 922, is recorded as the last valid start-of-pulse rising edge interrupt captured during the analysis. This time is used to determine the channel sequence of other channels found later in Stage 2, to be discussed hereinafter.

Once a match is achieved, the fine detection process 104 has the following information:
1. Pulse start time reference
2. Cycle Time
3. SOI operating mode (symbol rate, modulation index)

Potentially, the fine detection process 104 may also have the following information:
4. Dwell Time
5. Identifying header information Additional useful information may be obtained by examining the demodulated header bits. Processing the demodulated header bits does not affect the "match" or "no match" status of the SOI analysis.

If the Stage 1 does not return a match, then the candidate is demoted from Priority Candidate to Candidate and Stage 1 continues with the next Priority Candidate until either a successful match occurs or all of the Priority Candidates have been analyzed. If all Priority Candidates have been analyzed, then analysis stops until the criteria for Stage 1 are met again (sufficient Candidates and at least 1 Priority Candidate). Channels that are Candidates, but not priority candidates are not considered for analysis in Stage 1. If Stage 1 has been successful, the analysis is ready to proceed to Stage 2.

As the synchronization/bits ready interrupts occur, the demodulated header bits are read from the FPGA's buffer 536. Some data fields in the header could be potentially useful for speeding up the remaining SOI analysis verification. Successful error-free reception of these bits is not required but can be helpful if available.

In Stage 2, the remaining channels are analyzed similar to Stage 1, with some key differences:
1. SOI mode is already determined. Parallel processing (522B-522D) for other modes in the FPGA 500 is disabled.
2. Cycle time is already determined. Stage 2 does not require two consecutive matching cycle times.

Also, the fine detection process 104 in Stage 2 looks for only 1 or 2 pulses with sync correlator firing to indicate SOI was found (contrary to 3 pulses in Stage 1). If both the identifying header information and the pulse dwell time of the previously confirmed SOI candidate(s) are unknown, then two pulses are required to be analyzed so that the cycle time can be confirmed against the reference.

Figure 10:
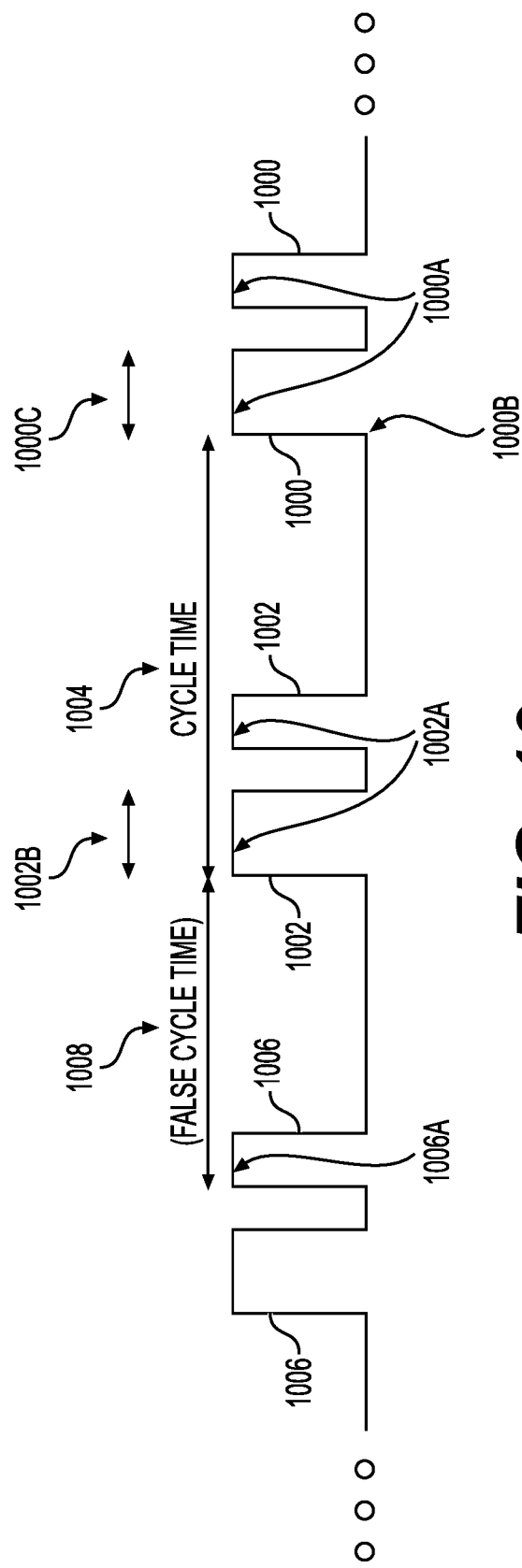
FIG. 10 is a schematic diagram of a Stage 2 cycle time verification where dwell time and identifying header information are unknown in the TDD mode, in accordance with some embodiments.

FIG. 10 is a schematic diagram of a Stage 2 cycle time verification where dwell time and identifying header information are unknown in TDD mode, in accordance with some embodiments. The same potential issues presented in FIG. 9 for the Stage 1 analysis in TDD mode are applicable here, except only one cycle time needs to be verified. If the cycle time 1004 between two SOI pulses 1000 and 1002 with Sync interrupts 1000A and 1002A matches the reference cycle time determined in Stage 1, then the channel is a Confirmed SOI Candidate, provided the reference on time 1000B resolves the channel to an unused channel sequence index with low timing error. If the dwell time was previously unknown, and the dwell times 1000C and 1002B of both pulses 1000 and 1002 match each other and are valid within a timing limit, then the dwell time becomes known. The false cycle time 1008 is similar to the false cycle time 910. In this case, the false cycle time 1008 is associated with faulty measurement of cycle time between pulses 1002 and 1006.

The demodulated bits on the two valid pulses 1000 and 1002 are checked similar to the Stage 1. The identifying header information is obtained if both valid pulses' 1000 and 1002 identifying header information match each other.

Figure 11:
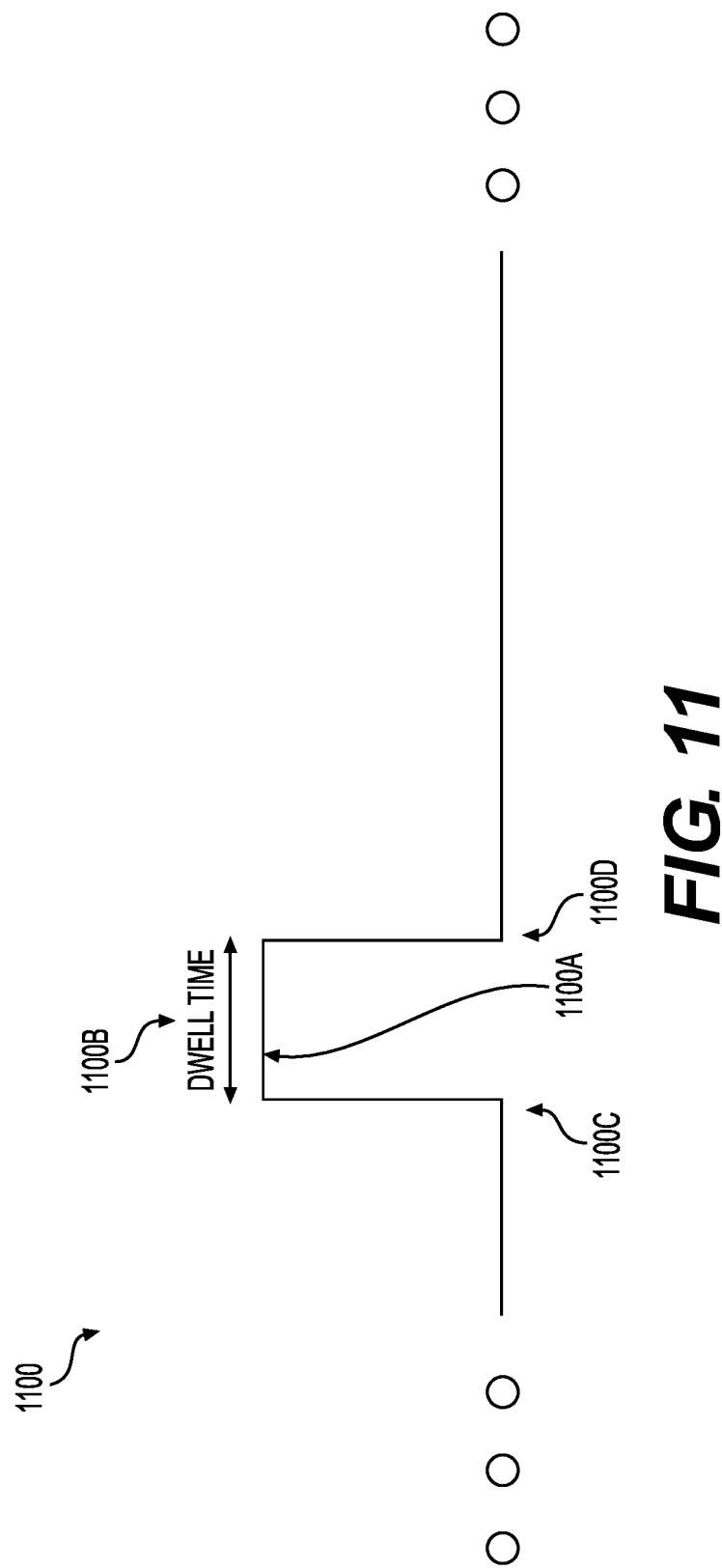
FIG. 11 is a schematic diagram of a Stage 2 cycle time verification where dwell time or identifying header information is known, in accordance with some embodiments.

FIG. 11 is a schematic diagram of a Stage 2 cycle time verification where dwell time or identifying header information is known, in accordance with some embodiments. The case where the dwell time or identifying header information are already known prior to Stage 2, the fine detection process may perform the Stage 2 analysis over only a single SOI pulse 1100. If dwell time is known, then the occurrence of a pulse 1100 with a sync/bits ready interrupt 1100A, and a dwell time 1100B that matches the previously verified dwell time (within error tolerance) is sufficient to declare a match, provided the reference on time resolves the channel to an unused channel sequence index with low timing error.

Note dwell time 1100B is computed using rising magnitude interrupt time 1100C and falling magnitude interrupt time 1100D. Likewise, if the demodulated bits in the identifying header information match the already known identifying header information, then that too is enough to declare a match, provided the low timing error. If a pulse with a sync interrupt occurs but dwell time and/or identifying header information checks do not match, then the analysis is extended in attempt to use cycle time to match as above. If none of the dwell time, the identifying header information or the cycle time are a match, then the channel is considered "Not a Match".

Figure 12:
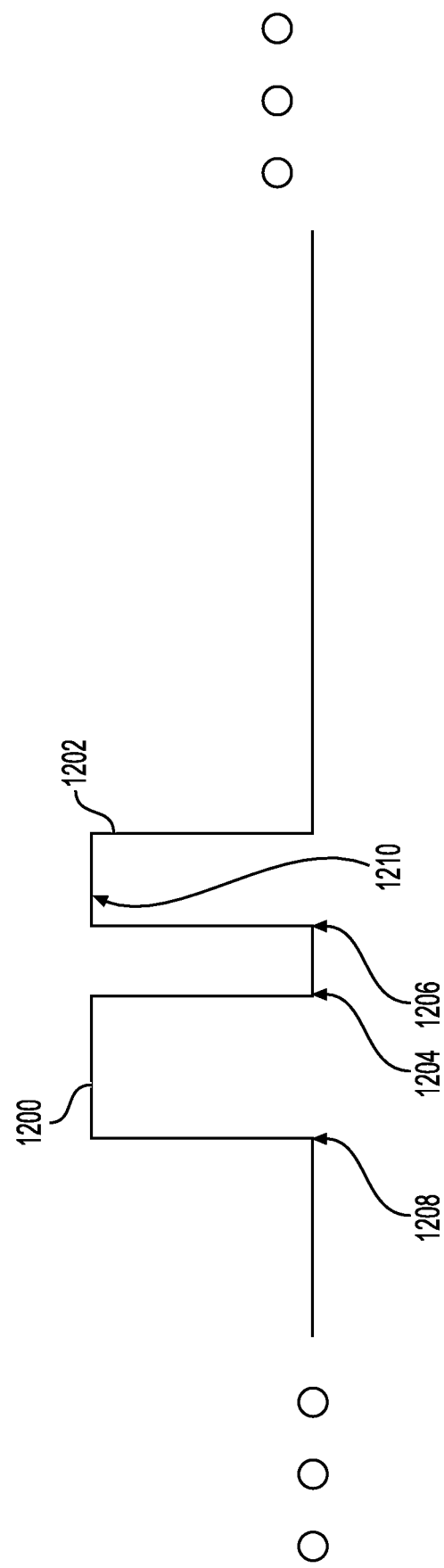
FIG. 12 is a schematic diagram of a bad single pulse analysis timing of a SOI operating in TDD mode, in accordance with some embodiments.

FIG. 12 is a schematic diagram of a bad single pulse analysis timing of a SOI operating in TDD mode, in accordance with some embodiments. If the SOI is operating in the TDD mode, then there is a chance the single pulse analysis described in FIG. 11 only finds the second pulse 1202 instead of the first pulse 1200. The fine detection process 104 may begin Stage 2's single pulse analysis just after the desired first pulse 1200 at time 1204, and triggered on the second pulse 1202 of the TDD mode at time 1206 producing an improper timing reference point (reference on time). The start time 1208 of the first pulse 1200 is the proper timing reference point (reference on time) for the beginning of the SOI pulse. However, the single pulse analysis selected the second pulse 1202, which also has a valid sync 1210, identifying header information, and may or may not have a matching dwell time.

If this occurs, one can expect to see a large timing error, where the proper timing reference point is not very close to any expected start time. When a large error in single pulse mode is encountered, the analysis should extend to two pulses as described in FIG. 10 and use the reference on time as indicated therein. If the absolute value of timing error of the single pulse reference on time exceeds a programmable percentage of the slot time, then the analysis may be extended to two pulses.

When any channel produces an SOI match, the relative timing is tracked between channels so that the proper channel sequence may be determined and keep track of which channels in the sequence have been found. When any match does occur, the rising edge of the most recent matching pulse is taken as a reference time, Tn, where n is the relative channel sequence index.

The coarse detection process 102 and fine detection process 104, including the operations of Stage 1 and Stage 2 of fine detection process 104 may be implemented using computer-executable instructions stored on one or more non-transitory machine-readable storage media. The instructions may be executed by one or more processing devices, such as the CPU described hereinafter in FIG. 13.

Figure 13:
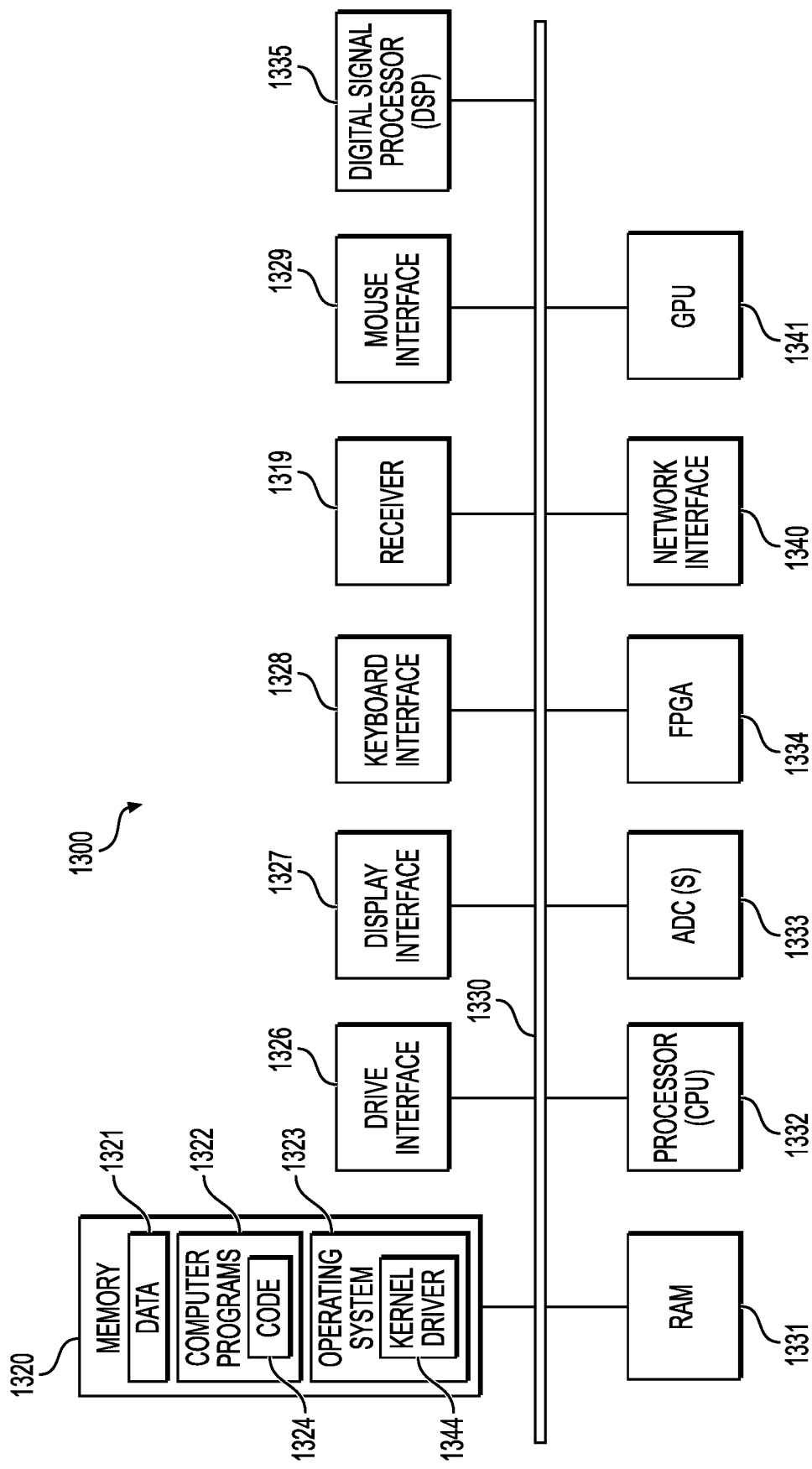
FIG. 13 is a schematic diagram of components that may be included in a computing system, in accordance with some embodiments.

FIG. 13 is a schematic diagram of components that may be included in computing system 1300, in accordance with some embodiments. As shown in FIG. 13, computing system 1300 includes memory 1320, which may include a non-transitory computer-readable medium such as a computer hard disk. Memory 1320 stores data 1321, computer programs 1322, and operating system 1323, among other things. Among the computer programs stored in memory 1320 is computer code 1324 associated with architecture 100. Also included in computing system 1300 are drive interface 1326, display interface 1327, keyboard interface 1328, mouse interface 1329, one or more computer buses 1330, random access memory (RAM) 1331, processor (CPU) 1332, and graphic processing unit (GPU) 1341. The computer system 1300 may include a display that works in conjunction with display interface 1327, and a keyboard that works in conjunction with keyboard interface 1328 for inputting text and user commands. Also, the computer system 1300 may include a mouse that works in conjunction with mouse interface 1329 for positioning a cursor on display screen and for inputting user commands.

Processor 1332 may be a microprocessor, programmable logic, or the like for executing computer programs, such those noted above, out of RAM 1331. Processor 1332 accesses computer programs (or other data) stored on an external device via drive interface 1326. GPU 1341 is a type of processing device. For example, the GPU 1341 may be a programmable logic chip that is configured to implement and to control display functionality. To this end, a GPU 1341 may be programmed to render images, animation, and video on the computer's screen. The GPU 1341 may be located on a plug-in card or in a chipset on the motherboard of the computing system, or the GPU 1341 may be in the same physical chip as the CPU 1332.

The computer system 1300 may have a receiver 1319. e.g., a radio receiver, to receive and/or transmit information wirelessly or the like. Computing system 1300 may also include one or more analog to digital converters (ADC) 1333 to convert incoming analog RF signals from receiver 1319 to digital samples. The computing system 1300 may also include a digital signal processor (DSP) 1335 to perform digital signal processing operations on the digital samples. The DSP 1335 may also be operated to improve the quality of the digital samples. The DSP may also be capable of executing computer programs that do not relate to signal processing. The computer system 1300 may also include an FPGA 1334 that performs specialized tasks, such as demodulation or the like, on the digital samples, including leveraging parallel processing capabilities. The FPGA 1334 may be similar to and perform the same operations as FPGA 500 of FIG. 5 discussed herein.

In some embodiments, the receiver 1319, ADC(s) 1333, and FPGA 1334 may be incorporated into a single unit.

Computing system 1300 includes a network interface 1340, such as an Ethernet port, for interfacing to a network, such as the Internet. In some embodiments, computing system 1300 may be a server connected to multiple computing systems 1300.

In some implementations, multiple electronic components, such as the GPU 1341, the CPU 1332, and/or the DSP 1335, may execute one or more computer programs concurrently or contemporaneously. In some implementations, the GPU 1341 may contain multiple components of each type shown in FIG. 13; for example, multiple CPUs, multiple GPUs, multiple DSPs, and so forth. One or more of each type of component may be configured to execute one or more computer programs concurrently, contemporaneously, or simultaneously.

The disclosure describes an architecture for positive identification and verification of multi-mode frequency hopping signals. The advantages provided by the architecture include the positive identification of a device in an unknown operational mode with over 100 possibilities. The architecture utilizes a Doppler mitigation technique to enable accurate demodulation in the presence of a frequency offset. Also, the architecture includes a hierarchy of verification methods for the fastest feasible identification. Moreover, the architecture allows for compensating measurement errors in timing profiles over long durations and measuring timing profiles without knowing if TDD is present or not.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for identifying and verifying multi-mode frequency hopping signals, the method comprising:
scanning, for a select time period, to capture a first set of signals, wherein the first set of signals comprises a signal of interest (SOI);

identifying from the first set of received signals a second set of signals having on times longer than a specified minimum dwell time;

providing a plurality of signal profiles associated with a plurality of pulsed patterns having expect dwell times and cycle times of the signal of interest;

identifying from the second set of signals a third set of signals that match at least one of the plurality of signal profiles;

determining whether the third set of signals meet a first criterion;

receiving demodulated data regarding the third set of signals;

upon determining the first criterion is met, obtaining characteristic information for each of the third set of signals;

verifying, using the characteristic information and demodulation data, for each of the third set of signals their cycle time, dwell time, and header information;

determining whether the verification of the third set of signals produced a match; and upon determining of the match, providing an indication of the signal of interest.

2. The method of claim 1, wherein identifying from the first set of signals the second set of signals comprises identifying from the first set of signals a subset of signals that have on-times greater than a specified minimum dwell time.

3. The method of claim 1, wherein identifying from the first set of signals the second set of signals comprises identifying from that first set of signals those signals that have off-times greater than a maximum aged time limit and removing those signals from further consideration.

4. The method of claim 1, wherein the third set of signals are assigned higher priority of over other remaining set of signals.

5. The method of claim 1, wherein identifying from the second set of signals the third set of signals comprises keeping track of timing information for at least three pulses per channel.

6. The method of claim 1, wherein at least one of the plurality of signal profiles is associated with a signal being in a time-division duplex (TDD) mode.

7. The method of claim 1, wherein the characteristic information comprises a start time reference, a dwell time, a cycle time, or a signal of interest operating mode.

8. The method of claim 1, wherein the header information comprises identifying information.

9. The method of claim 8, wherein obtaining characteristic information comprises obtaining the identifying information by determining if at least 2 of 3 demodulated headers both match.

10. The method of claim 1, wherein receiving demodulated data regarding the third set of signals comprises accounting for a frequency offset between a tuned frequency of a receiver and a perceived frequency of an emitter.

11. The method of claim 1, wherein receiving demodulated data regarding the third set of signals comprises determining when a bits ready interrupt is generated indicating the demodulated data is available.

12. A system for identifying and verifying multi-mode frequency hopping signals, the system comprising
one or more computing device processors; and
one or more computing device memories, coupled to the one or more computing device processors, the one or more computing device memories storing instructions executed by the one or more computing device processors, wherein the instructions are configured to:

scan, for a select time period, to capture a first set of signals, wherein the first set of signals comprises a signal of interest (SOI);

identify from the first set of signals a second set of signals having on times longer than a specified minimum dwell time;

provide a plurality of signal profiles associated with a plurality of pulsed patterns having expected dwell times and cycle times of the signal of interest;

identify from the second set of signals a third set of signals that match at least one of the plurality of signal profiles;

determine whether the third set of signals meet a first criterion;

upon determining the first criterion is met, receive demodulated data regarding the third set of signals;

obtain characteristic information for each of the third set of signals;

verify, using the characteristic information and demodulation data, for each of the third set of signals their cycle time, dwell time, and header information;

determine whether the verification of the third set of signals produced a match; and upon determining of the match, provide an indication of the signal of interest.

13. The system of claim 12, wherein while identifying from the first set of signals the second set of signals, the instructions are configured to identify from the first set of signals a subset of signals that have on-times greater than a specified minimum dwell time.

14. The system of claim 12, wherein while identifying from the first set of signals the second set of signals, the instructions are configured to identify from that first set of signals those signals that have off-times greater than a maximum aged time limit and removing those signals from further consideration.

15. The system of claim 12, wherein the third set of signals are assigned higher priority of over other remaining set of signals.

16. The system of claim 12, wherein while identifying from the second set of signals the third set of signals, the instructions are configured to keep track of timing information for at least three pulses per channel.

17. The system of claim 12, wherein at least one of the plurality of signal profiles is associated with a signal being in a time-division duplex (TDD) mode.

18. The system of claim 12, wherein the characteristic information comprises start time reference, dwell time, cycle time, or a signal of interest operating mode.

19. The system of claim 12, wherein while obtaining characteristic information, the instructions are configured to obtain identifying header information by determining if at least 2 of 3 demodulated headers match.

20. A non-transitory computer-readable storage medium storing instructions which when executed by a computer cause the computer to perform a method for identifying and verifying multi-mode frequency hopping signals, the method comprising:

scanning, for a select time period, to capture a first set of signals, wherein the first set of signals comprises a signal of interest (SOI);

identifying from the first set of received signals a second set of signals having on times longer than a specified minimum dwell time;

providing a plurality of signal profiles associated with a plurality of pulsed patterns having expect dwell times and cycle times of the signal of interest;

identifying from the second set of signals a third set of signals that match at least one of the plurality of signal profiles;

determining whether the third set of signals meet a first criterion;

receiving demodulated data regarding the third set of signals;

upon determining the first criterion is met, obtaining characteristic information for each of the third set of signals;

verifying, using the characteristic information and demodulation data, for each of the third set of signals their cycle time, dwell time, and header information;

determining whether the verification of the third set of signals produced a match; and upon determining of the match, providing an indication of the signal of interest.

* * * * *